(12) United States Patent
Sun

(10) Patent No.: US 11,003,781 B2
(45) Date of Patent: May 11, 2021

(54) ROOT KEY PROCESSING METHOD AND ASSOCIATED DEVICE

(71) Applicant: MEDIATEK, INC., Hsinchu (TW)

(72) Inventor: Ming Yong Sun, Shanghai (CN)

(73) Assignee: MEDIATEK, INC., Hsinchu (TW)

( * ) Notice: Subject to any disclaimer, the term of this patent is extended or adjusted under 35 U.S.C. 154(b) by 164 days.

(21) Appl. No.: 16/180,311

(22) Filed: Nov. 5, 2018

(65) Prior Publication Data

US 2019/0163913 A1 May 30, 2019

(30) Foreign Application Priority Data

Nov. 29, 2017 (CN) .......................... 201711233015.2

(51) Int. Cl.
| | | |
|---|---|---|
| *G06F 21/57* | (2013.01) | |
| *G06F 21/60* | (2013.01) | |
| *G06F 9/445* | (2018.01) | |
| *G06F 12/14* | (2006.01) | |
| *G06F 21/79* | (2013.01) | |
| *G06F 9/4401* | (2018.01) | |

(52) U.S. Cl.
CPC .......... *G06F 21/575* (2013.01); *G06F 9/4403* (2013.01); *G06F 9/445* (2013.01); *G06F 12/1408* (2013.01); *G06F 21/602* (2013.01); *G06F 21/79* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 9,329,992 B2 | 5/2016 | Wu et al. | |
| 2003/0200454 A1* | 10/2003 | Foster | H04L 9/0894 726/17 |
| 2012/0210113 A1 | 8/2012 | Wood et al. | |
| 2014/0006805 A1 | 1/2014 | Colp et al. | |
| 2014/0250290 A1 | 9/2014 | Stahl et al. | |
| 2016/0125187 A1* | 5/2016 | Oxford | H04L 63/123 713/2 |
| 2016/0350550 A1 | 12/2016 | Wang et al. | |
| 2019/0081803 A1 | 3/2019 | Gulati et al. | |

FOREIGN PATENT DOCUMENTS

| | | |
|---|---|---|
| CN | 106406939 A | 2/2017 |
| CN | 106453196 A | 2/2017 |
| TW | I521344 B | 2/2016 |
| TW | 201717092 A | 5/2017 |

\* cited by examiner

*Primary Examiner* — Fahmida Rahman
(74) *Attorney, Agent, or Firm* — Oblon, McClelland, Maier & Neustadt, L.L.P.

(57) ABSTRACT

A root key processing method and an associated device are disclosed. The root key processing method is performed by a processor connected to a memory configured with an RPMB section, and includes the following steps. The processor detects whether a root key of the RPMB section is already written in the memory after the processor is powered on. If not, in a secure activation process of the processor, the root key of the RPMB section is written to the memory, wherein the secure activation process is that the processor does not activate a non-secure operation system. The method is capable of preventing leakage of the root key from the memory.

12 Claims, 8 Drawing Sheets

ROOT KEY PROCESSING METHOD AND ASSOCIATED DEVICE

This application claims the benefit of China application Serial No. 201711233015.2, filed Nov. 29, 2017, the subject matter of which is incorporated herein by reference.

BACKGROUND OF THE INVENTION

Field of the Invention

The invention relates to the field of storage technology, and more particularly to a root key processing method and an associated device.

Description of the Related Art

A memory device such as an embedded multimedia card (EMMC) is generally provided with a section having a replay protected property, that is, a replay protected memory block (RPMB), which is usually used for storing some core-sensitive data, such as data requiring prevention of illegal modification, e.g., a key or a serial number related to fingerprint payment on a cell phone.

To prevent illegal modification of data written to or data read from the RPMB section, a root key needs to be pre-written in the RPMB section. The data written to or data read from the memory is together transmitted with a value generated by the root key of the RPMB section and the data. When the memory or the processor receives the data, a new value is generated according to the root key stored at a local end and the received data, and is compared with the received key to determine whether the data has been illegally modified during the transmission process.

Therefore, the root key of the RPMB section is a critical part in the realization of RPMB section replay protection. Currently, how to securely write a root key of the RPMB section in a memory to prevent leakage of the root key of the RPMB section is an essential task in RPMB section replay protection.

SUMMARY OF THE INVENTION

It is an object of the present invention to provide a root key processing method and an associated device capable of preventing leakage of a root key from a memory.

The present invention discloses a root key processing method, which is performed by a processor connected to a memory configured with a replay protection memory block (RPMB) section, and includes the following steps.

A processor detects whether a root key of the RPMB section is already written in the memory after the processor is powered on, wherein the root key is for determining whether data written to or data read from the RPMB section is illegally modified.

If not, during a secure activation process of the processor, the root key of the RPMB section is written to the memory, wherein the secure activation process is that the processor does not activate a non-secure operating system.

To resolve the above problem, a processing for processing a key or an RPMB section is provided according to a second aspect of the present invention. The processing circuit is for performing the above root key processing method.

To resolve the above problem, a processing for processing a key or an RPMB section is provided according to a third aspect of the present invention. The processor includes the above processing circuit and a memory connected to the processor. The memory is configured with an RPMB section, and the processing circuit is for processing the root key of the RPMB section.

To resolve the above problem, a non-volatile storage medium storing a computer program is provided according to a fourth aspect of the present invention. The computer program is executed by the processor to perform the above root key processing method.

In the above solutions, the processor writes the root key of the RPMB section to the memory during a secure activation process. Because the processor has not yet activated any non-secure operating system during the secure activation process, the root key of the RPMB section does not go through the non-secure operating system, hence preventing leakage of the root key of the RPMB section from the memory during the non-secure operating system, further ensuring the RPMB section replay prevention protection.

The above and other aspects of the invention will become better understood with regard to the following detailed description of the preferred but non-limiting embodiments. The following description is made with reference to the accompanying drawings.

DETAILED DESCRIPTION OF THE INVENTION

Solutions according to embodiments of the present invention are described in detail with the accompanying drawings below.

In the description below, for illustration rather than definition purposes, specific details such as system structures, interfaces and technologies are described to thoroughly understand the present invention.

In the disclosure, the term "and/or" is an association relationship of associated objects and represents three relationships. For example, A and/or B may represent three scenarios of independent existence of A, concurrent existence of A and B, and independent existence of B. Further, the symbol "/" in the disclosure indicates that an "or" relationship exist between preceding and subsequent associated objects.

To better understand the solutions of the present invention, specific functions and structure of a replay protection memory block (RPMB) section in a memory is explained with examples below.

An RPMB section is a section having a replay prevention protection property configured in memory device such as an embedded multi-media card (EMMC), and is for storing core-sensitive data. The section may be used when a user needs to store important data, and may adopt an authorized encryption mechanism to protect data.

In one embodiment, the RPMB section has the following structures—a first register, a second register and a storage unit.

The first register may specifically be a 32-byte register, and is for storing a root key of the RMPB section (the root key may be referred to as an authentication key), e.g., using a register value as the root key. The register can be written only once, and is only writable and cannot be read by a component except the memory.

The second register may specifically be a 4-byte register, and is for storing a write counter indicating the number of times of successful writing operations performed on the RPMB section. Each time the processor performs a writing operation on the RPMB section, the write counter is included in a writing operation instruction that the processor reads from the memory, such that a control circuit in the memory can compare whether the write counter included in the writing operation instruction is equal to the write counter recorded in the second register, and the current writing operation is declined when the results do not match. Such is a critical mechanism for the prevention of RPMB section replay attack. The write counter is capable of preventing replay, and preventing an unauthorized device from re-writing previously written data in the RPMB section.

The storage unit is a real data storage unit section of the RPMB section.

Figure 1:
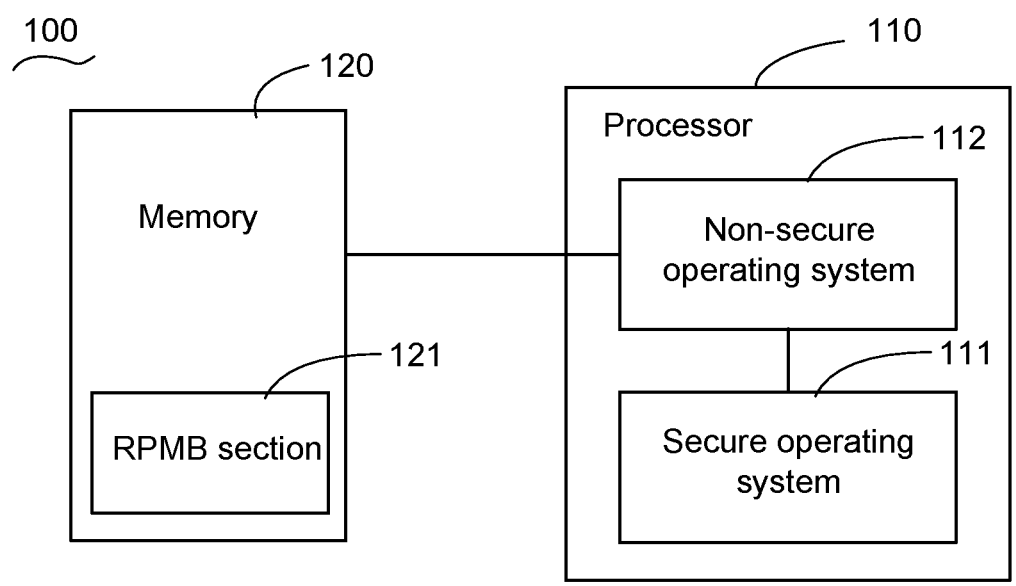
FIG. 1 is a structural schematic diagram of a processing system according to an embodiment of the present invention.

FIG. 1 shows a structural schematic diagram of a processing system consisting of a memory and a processor according to an embodiment of the present invention. In this embodiment, the processing system 10 includes a processor 110 and a memory 120. The processor 110 and the memory 120 are connected by means of a physical bus, for example.

The memory 120 is configured with, for example, the above RPMB section 121, e.g., an embedded memory such as an EMMC.

The processor 110 may specifically be a system-on-chip (SoC) such as a security chip, and is for running a secure operating system 111 and a non-secure operating system 112. The secure operating system 111 is an operating system that can be run in a trusted execution environment (TEE), and the non-secure operating system 112 is an operating system such as Linux and Android. Specifically, the processor 110 may include two independent circuits to respectively run the secure operating system 111 and the non-secure operating system 112, or adopt a same circuit to run the two operating systems above.

In this embodiment, on the basis of security considerations and requirement of mutually exclusive management used by hardware resources, a driver program of the memory 120 is placed and executed in the non-secure operating system 112. As a result, reading and writing instructions of the secure operating system 111 for the RPMB section 121 of the memory 120 need to be handled by the non-secure operating system 112 by invoking a driver program of the memory 120. Thus, the secure operating system 111 performs reading and writing operations on the memory 120 through the non-secure operating system 112. That is to say, data written to the RPMB section 121 of the memory 120 by the secure operating system 111 needs to be inputted into the memory 120 through the non-secure operating system 112, and data read from the RPMB section 121 of the memory 120 also needs to be fed back to the secure operating system 111 through the non-secure operating system 112.

The root key of the RPMB section 121 is generated in the secure operating system 111 of the processor and then written to a predetermined region of the memory, e.g., stored in the first register above. Thus, after the processor 110 is normally activated and runs the two operating systems, the root key generated by the secure operating system 111 can only be written to the memory 120 through the non-secure system 112. As such, the root key can be easily intercepted when going through the non-secure system 112, leading to leakage of the root key of the RPMB section 121. Therefore, in the present invention, before the processor 110 runs the non-secure system 112, i.e., during the secure activation process, the root key of the RPMB section 121 is written to the memory 120. Hence, the root key is directly written to the memory 120 without going through the non-security operating system 112, preventing the non-secure system 112 from leaking the root key of the RPMB section 121. Further, it is also defined that the secure operating system is forbidden from sending to the non-secure operating system an instruction of writing a root key to the memory, so as to eliminate attacks such as illegally acquiring the root key from the non-secure system.

More specifically, details of how the processor 110 writes the root key and subsequent reading and writing operations are given in the embodiments below.

Figure 2:
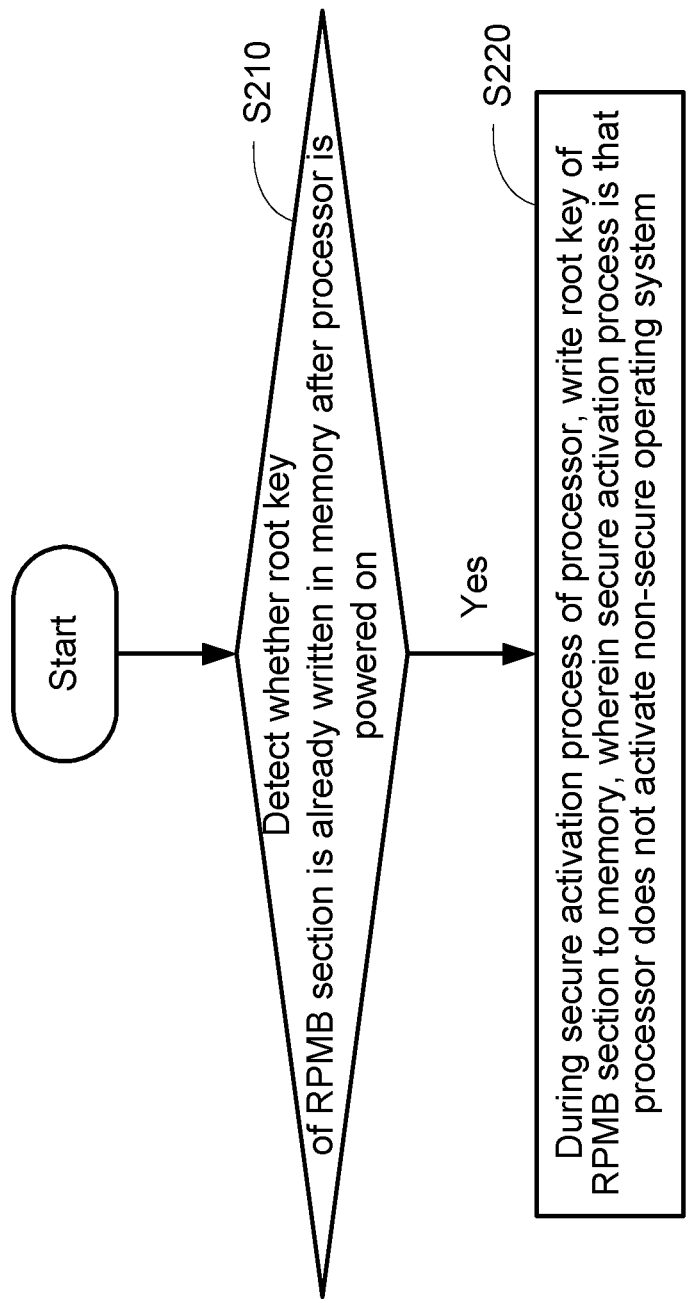
FIG. 2 is a flowchart of a root key processing method according to an embodiment of the present invention.

FIG. 2 shows a flowchart of a root key processing method of an RPMB section of a memory according to an embodiment of the present invention. In this embodiment, the method is performed by the above processor 110, and includes the steps below.

In step S210, after the processor is powered on, the processor detects whether the root key of the RPMB section is already written in the memory. The process ends if so, and steps associated with the reading/writing operations shown in FIG. 6/7 can be performed when reading/writing operations on the RPMB section are later needed. If the root key of the RPMB section is not already written in the memory, step S220 is performed.

The root key of the RPMB section is for verifying whether data written to or read from the RPMB section has been illegally modified, and specific details are as described in the above embodiment. The power-on of the processor in step S210 may take place before or after factory ship-out. More specifically, the processor performs the secure activation process after being powered on, and the processor detects during the secure activation process whether the root key of the RPMB section is already written in the memory.

In step S220, during the secure activation process of the processor, the root key of the RPMB section is written to the memory. The secure activation process is that the processor does not activate a non-secure operating system.

For example, when the processor performs the secure activation process after being powered on, the processor generates the root key by using a memory identifier of the memory such as a sequence number of a unique chip identifier (CID) of the memory chip, and writes the generated root key in a predetermined region of the memory. The predetermined region can be written only once, e.g., the above first register of the RPMB section. Because the configured region can be written only once, the processor can perform steps S210 to S220 during the first power-on, or does not perform steps S210 and S220 when the processor is powered on after step S220 is completely performed.

In this embodiment, the processor writes the root key of the RPMB section during the secure activation process. Because the processor has not yet activated the non-secure operating system during the secure activation process, the root key of the RPMB section does not go through the non-secure operating system, thereby preventing leakage of the root key of the RPMB section in the non-secure operating system, further ensuring RPMB section replay prevention protection.

Figure 3:
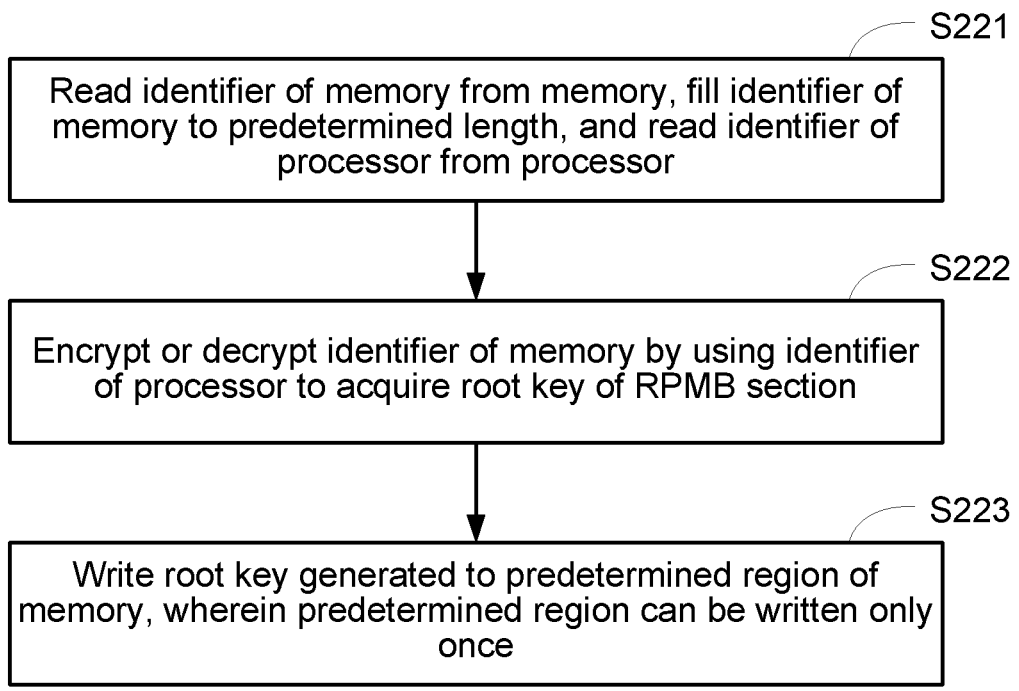
FIG. 3 is a flowchart of writing a root key in step S220 in FIG. 1.

Further, if a memory is connected to a processor and used for a period of time and is then connected to another processor and used, a condition that both of the processors having been connected and used with the same memory is established. At this point, if a root key is directly generated from an identifier of the memory, the root keys generated by the same algorithm adopted by the two processors are also the same, such that one of the processor may obtain an RPMB section data packet of the other processor through channel interception from the non-secure operating system run by the other processor. Thus, to ensure that the root key of the RPMB section corresponding to each processor is unique, the prevention of RPMB section replay attacks needs to be further enhanced. In view of the above, in another embodiment, the processor may combine an identifier of the processor to generate a root key so as to ensure the uniqueness of the root key. Referring to FIG. 3, step S220 of writing the root key of the RPMB section to the memory includes the sub-steps below.

In step S221, the identifier of the memory is read from the memory, the identifier of the memory is filled to a predetermined length, and the identifier of the processor is read from the processor.

The identifier of the memory is specifically, for example, a sequence of the unique CID of the memory chip. To facilitate subsequent operations, after obtaining the identifier of the memory from the memory by using the driver of the memory, the identifier of the memory is filled to a predetermined length, e.g., 256 bits. In other embodiments, the processor may, for example but not limited to, omit the above filling operation.

The identifier of the processor may be, for example but not limited to, a private key that the processor writes in an internal storage region of the processor when the processor is shipped out of the factory, and cannot be modified after the processor is shipped out of the factory. For example, assuming that the processor is a security chip, the processor identifier is a hardware unique key, which is a specific feature of a security chip and commonly has a length of 128 bits. The hardware unique key is burned in a one-time programmable (OTP) storage region or an e-fuse memory region in the chip, and cannot be modified after factory ship-out. The hardware unique keys burned in various security chips are different from one another, and values of the keys burned are strictly confidential or not at all recorded, so as to ensure that the keys are not acquirable by any illegal individuals.

The identifier of the processor is configured to be readable by only the processor in the secure operating system to ensure that the identifier of the processor is not acquirable by the non-security system, thereby preventing the non-secure system from adopting the same method and acquiring the root key of the RPMB section.

In step S222, the identifier of the memory is encrypted or decrypted by using the identifier of the processor to obtain the root key of the RPMB section.

For example, an advanced encryption standard (AES) algorithm, e.g., the SHA256 algorithm, is adopted to encrypt or decrypt the filled identifier of the memory by using the identifier of the processor to obtain a hash value as the root key of the RPMB section.

In step S223, the generated root key is written to a predetermined region of the memory. The predetermined region can be written only once.

In this embodiment, a unique root key is generated by using an identifier of a processor and an identifier of a memory, such that the root key is applicable to only the combination of the processor and the memory, thereby preventing illegal acquisition of data of the RPMB section of the memory after the memory or the processor is replaced.

It should be understood that, the processor may also generate the root key of the RPMB section by using solely the identifier of the processor. When the processor generates the root key of the RPMB section by using solely the identifier of the memory or solely the identifier of the processor, the identifier may be directly used as the root key or a predetermined operation may be performed on the identifier to obtain the root key. Further, the step of generating the root key may not be performed by the processor but by an exclusive hardware encryption unit. However, the identifier of the processor is configured to be accessible by only the hardware encryption unit in a secured state, and the non-secure system cannot operate the hardware encryption unit in the secure state.

Figure 4:
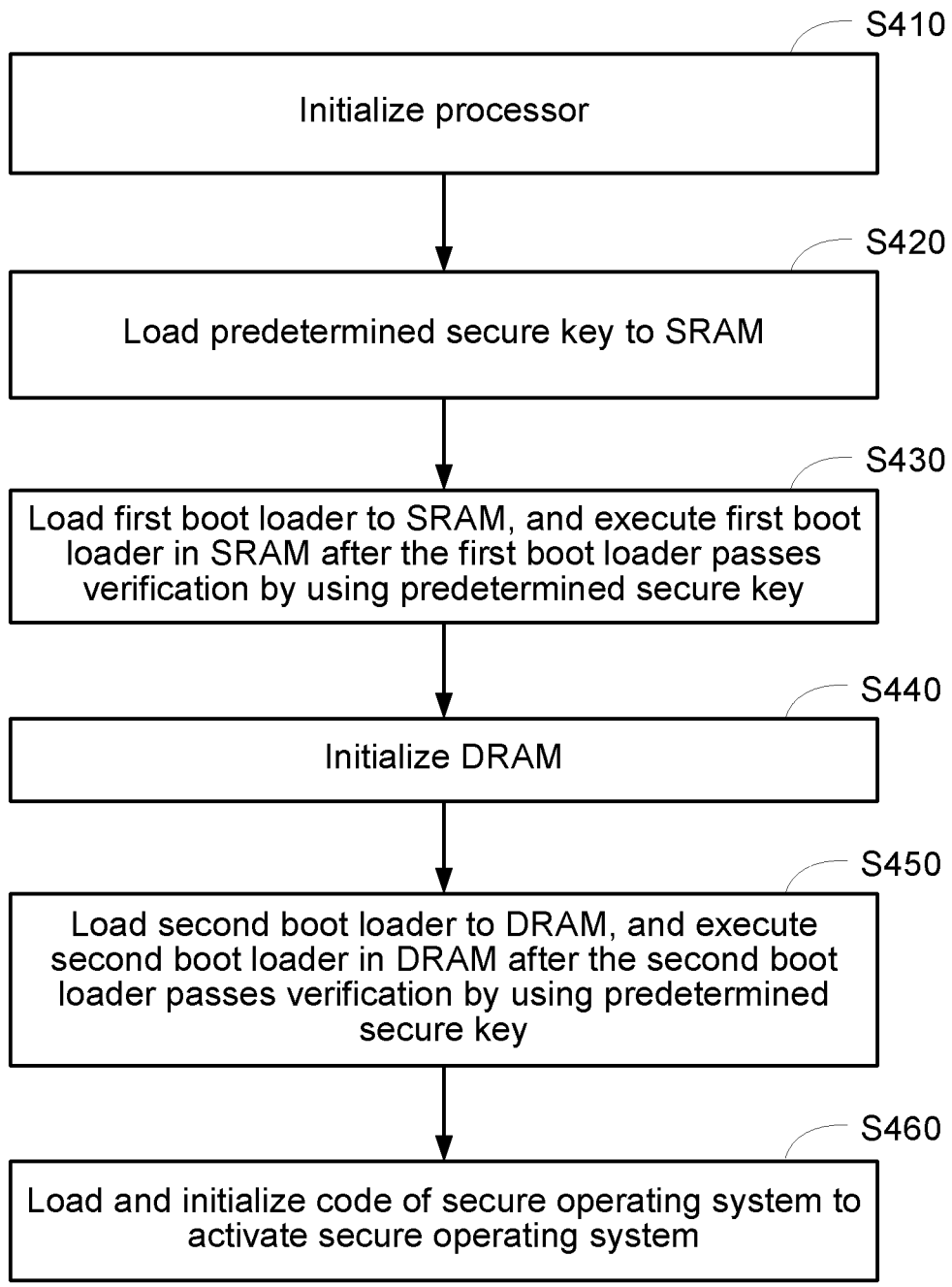
FIG. 4 is a flowchart of a secure activation process of a processor according to an embodiment of the present invention.

FIG. 4 shows a flowchart of a secure activation process of the processor according to an embodiment of the present invention. The secure activation method includes the steps below.

In step S410, the processor is initialized.

For example, a secure activation code is loaded from a read-only memory (ROM) in the processor chip to start the secure activation process. Further, the processor is initialized. The processor detects whether a NAND flash or the above memory configured with the RPMB section is activated, and correspondingly activates initialization of the NAND flash or the memory.

In step S420, a predetermined secure key is loaded in a static random access memory (SRAM).

In continuation of the above example, after completing the above initialization, the predetermined secure key is loaded from the ROM to the SRAM, and the predetermined secure key is verified by using a verification secure key. The configured secure key is stored in the SRAM if the verification is successful.

In step S430, a first boot loader is loaded to the SRAM, and the first boot loader in the SRAM is executed after the first boot loader passes verification by using the secure key.

To ensure that the code in the SRAM is not modified, the code is verified by using the secure key in the chip, i.e., public key signing is performed, and the code in the SRAM is executed.

In step S440, the DRAM is initialized.

In step S450, a second boot loader is loaded to the DRAM, and the second boot loader in the DRAM is executed after the second boot loader passes the verification by using the configured secure key.

To ensure that the code in the DRAM is not illegally modified, the code is verified by the secure key in the chip, i.e., public key signing is performed, and the code in the DRAM is executed. Since the process from the processor is powered on to step S450 is signed and protected, this entire process is secure.

In step S460, a code of the secure operating system is loaded and initialized to activate the secure operating system.

At this point, the secure operating system is security protected by the circuit. After performing step S460, the processor again loads and executes a non-secure activation code so as to switch to run in the non-secure operating system.

In steps S210 and S220 in FIG. 2, the processor may perform the detection of whether the root key is already written and the writing of the root key at any moment in steps S410 to S460 before the processor activates the non-secure operating system. The amount of processing resources required for initializing the DRAM is larger due to a larger size of the DRAM. Thus, the processor can perform writing of the root key or perform the detection of whether the root key is already written and the writing of the root key after step S440 of initializing the DRAM (e.g., during or after step S450 of executing the second boot loader), so as to prevent seizing of resources.

Figure 5:
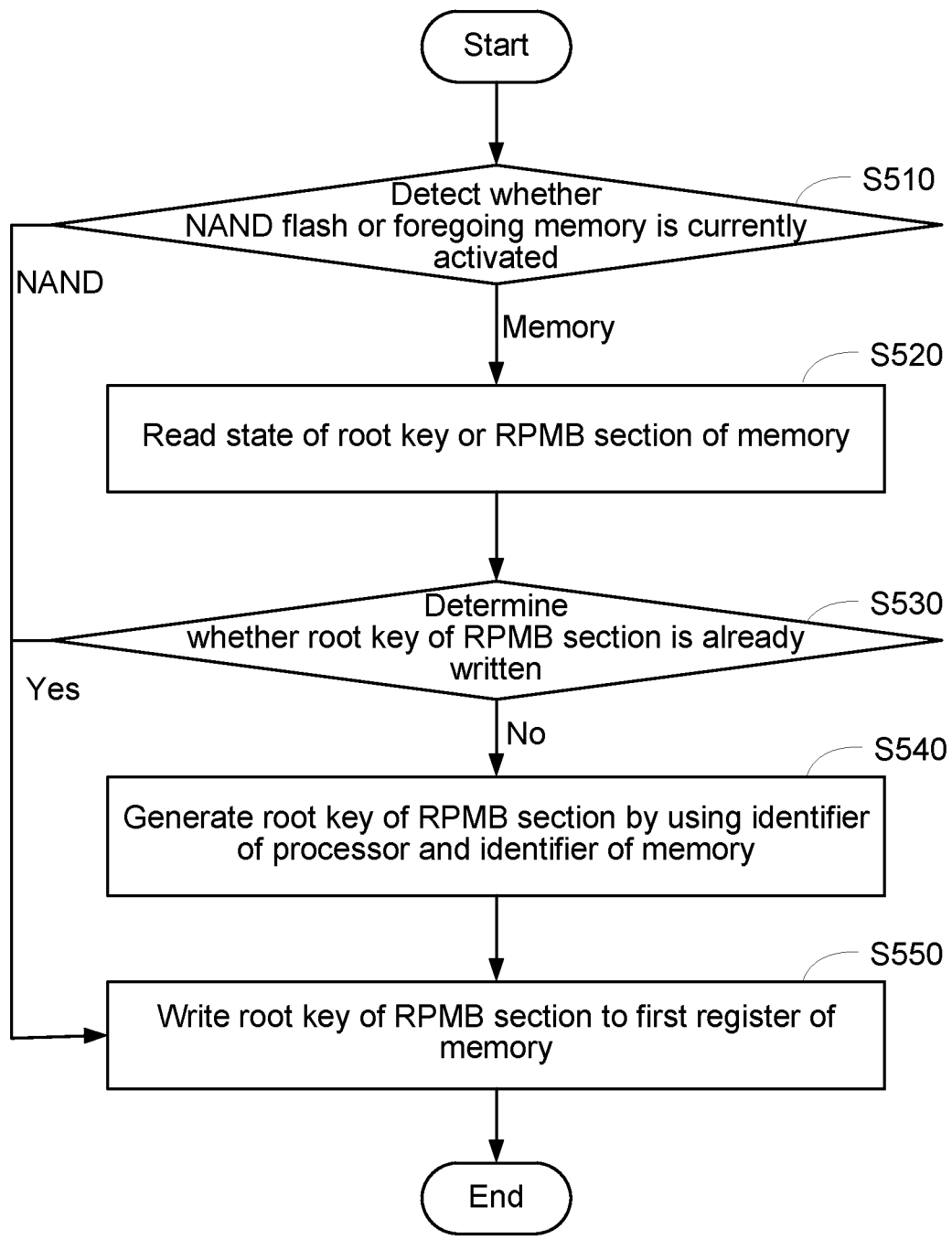
FIG. 5 is a flowchart of a root key processing method according to another embodiment of the present invention.

FIG. 5 shows a flowchart of a root key processing method according to another embodiment of the present invention. In this embodiment, writing a key is given as an example for illustration. The method may be performed in or after any of steps S440 to S450 in FIG. 4, and includes the steps below.

In step S510, it is detected whether the NAND flash or the memory is activated. If the NAND flash is activated, the current root key writing process ends; if the memory configured with the RPMB section is activated, step S520 is performed.

In step S520, a state of the root key of the RPMB section of the memory is read.

In step S530, it is determined whether the root key of the RPMB section is already written in the memory.

It is determined whether the root key of the RPMB section is already written in the memory according to the read state of the root key. The root key writing process ends if the root key is already written; if not, step S540 is performed.

In step S540, the root key of the RPMB section is generated by using the identifier of the processor and the identifier of the memory.

Specific details for generating the root key of the RPMB section can be referred from the description associated with the foregoing embodiments.

In step S550, the root key of the RPMB section is written to the first register of the memory.

The method of the above embodiment specifically describes details for generating the root key of the RPMB section and verifying whether the data written in or data read out from the RPMB section has been illegally modified. Thus, to achieve the above verification, after generating the root key of the RPMB section in the method of the above embodiment, the processor further stores the root key in a secure memory of the processor. The secure memory is a memory region inaccessible to the non-secure operating system, and is, for example, a memory for storing a code in the phase of secure activation performed by the processor, or in a memory for storing kernels of the secure operating system. It should be understood that, the secure memory may be configured in the processor, or be independent from the processor and connected to the processor.

Figure 6:
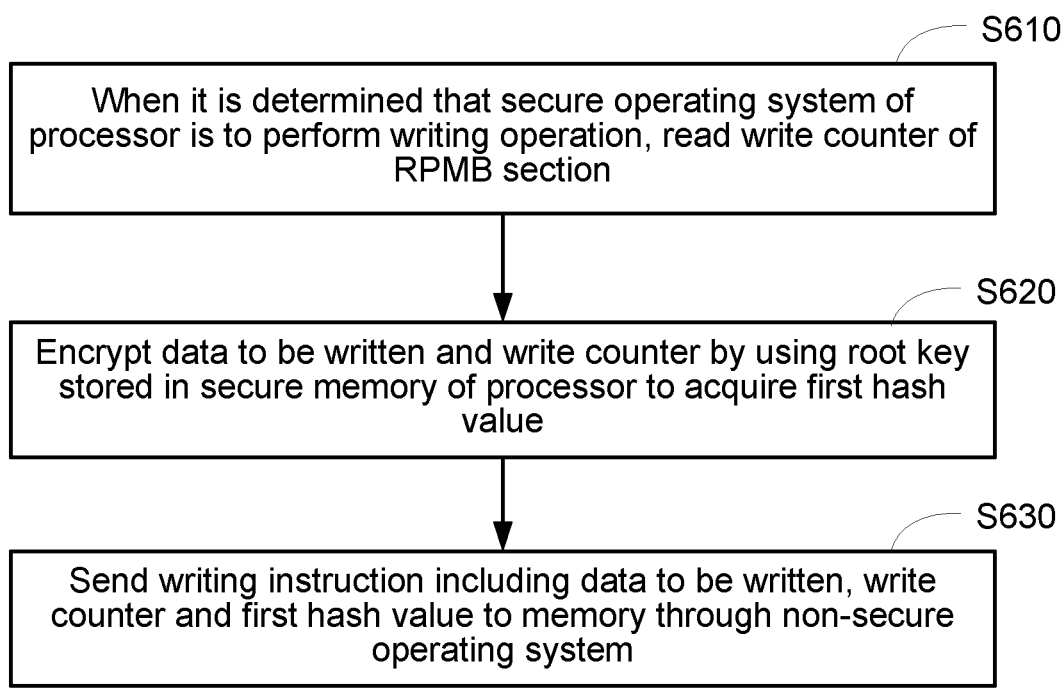
FIG. 6 is a partial flowchart of a root key processing method according to yet another embodiment of the present invention.

FIG. 6 shows a partial flowchart of a root key processing method according to another embodiment of the present invention. In this embodiment, after the processor finishes writing the root key of the RPMB section, the processor further performs a writing operating on the RPMB section. The writing operating is performed by the secure operating system of the processor, and the secure operating system performs the writing operation through the non-secure operating system. That is, in addition to the steps of the method of the above method, the processing method further includes the following steps for realizing the writing operating by using the root key.

In step S610, when it is determined that the secure operating system run by the processor is to perform the writing operation, the write counter of the RPMB section is read.

For example, the processor can acquire the write counter of the total number of times of successful writing operations on the RPMB section from the second register.

In step S620, the data to be written and the write counter are encrypted by using the root key of the processor stored in the secure memory to acquire a first hash value.

As previously described, the root key of the RPMB section is written to the memory and also stored in the secure memory. Therefore, to perform the writing operation, the secure operating system of the processor reads the stored root key from the secure operating system, and generates the first hash value for verification by using the root key. For example, an SHA256 operation is performed the data to be written, the write counter read and other information by using the read root key to generate a 256-bit hash value.

In step S630, a writing instruction including the data to be written, the write counter and the first hash value is sent to the memory through the non-secure operating system.

The writing instruction may be generated in the secure operating system and be sent to the non-secure operating system. Alternatively, the writing instruction may be generated by the non-secure operating system according to the first hash value, the data to be written and the write counter sent by the secure operating system. After the non-secure operating system receives or generates the writing instruction, the driver of the memory is invoked to write and transmit the writing instruction to the memory through a physical bus.

A controller in the memory adopts an operation method such as that in step S620 to encrypt the data to be written and the write counter included in the writing instruction by using the root key written in step S220 to acquire a second hash value. Further, when it is compared and determined that the write counter in the writing instruction is consistent with the current write counter of the RPMB section and the first hash value in the writing instruction is consistent with the second hash value, the data to be written is written to the RPMB section, and the write counter of the RPMB section is added by one and recorded. If the write counter in the writing instruction is inconsistent with the current write counter of the RPMB section, or the first hash value in the writing instruction is inconsistent with the second has value, the current writing operation is declined.

In this embodiment, writing process verification between the processor and the memory is ensured, thus preventing data to be written from being illegally modified during a transmission process.

Figure 7:
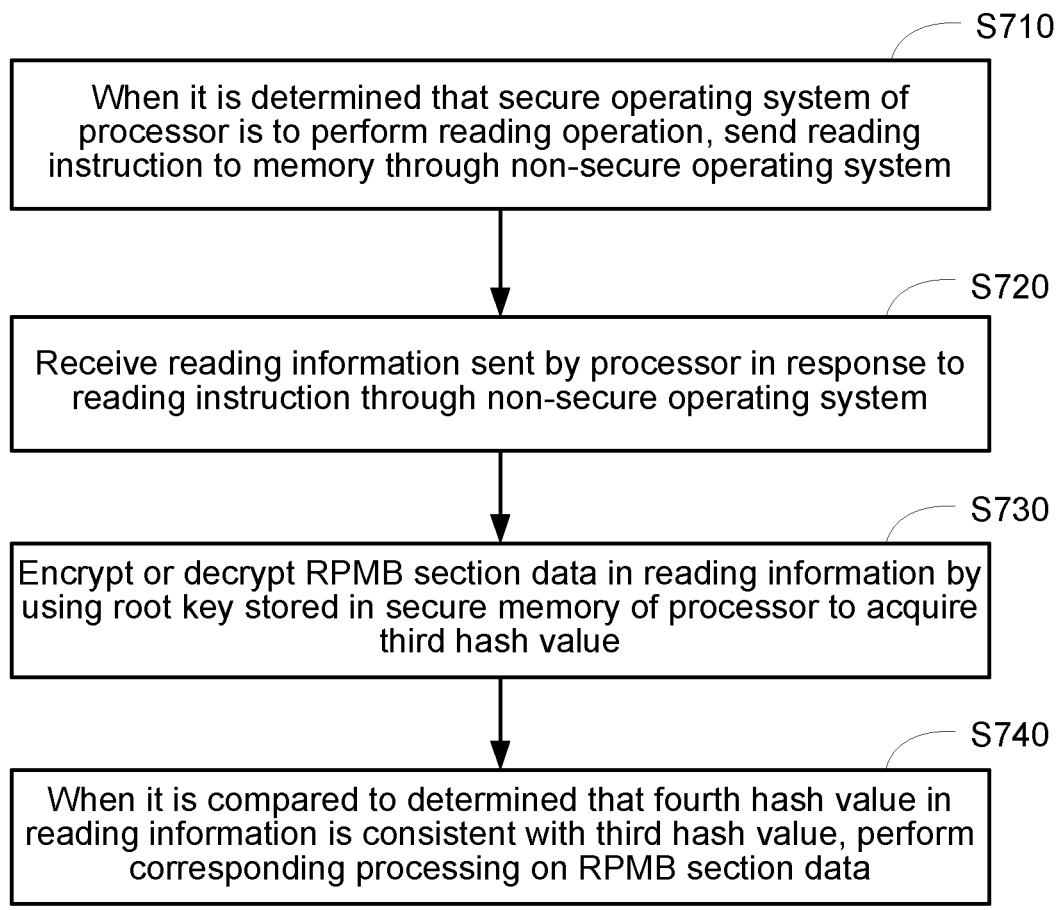
FIG. 7 is a partial flowchart of a root key processing method according to yet another embodiment of the present invention.

FIG. 7 shows a partial flowchart of a root processing method of an RPMB section according to another embodiment of the present invention. In this embodiment, after the process finishes writing the root key of the RPMB section, the processor further performs a reading operation on the RPMB section. The reading operation is handled by the secure operating system run by the processor, and the secure operating system performs the reading operation through the non-secure operating system. That is, in addition to performing the steps of the above embodiment, the processing further includes the following steps for realizing the reading operation by using the root key.

In step S710, when it is determined that the secure operating system run by the processor is to perform a reading operation, a reading instruction is sent to the memory through the non-secure operating system.

For example, the secure operating system generates a reading instruction including an address of the RPMB section and sends the reading instruction to the non-secure operating system. The non-secure operating system invokes a driver of the memory so as to store the reading instruction to the memory.

In step S720, reading information sent by the memory in response to the reading instruction is received through the non-secure operating system.

For example, a controller in the memory parses and acquires the address included in the component from the reading instruction, and reads data pointed by the address from the RPMB section. Further, the memory performs an operation (e.g., the SHA256 operation) on the data read by using the root key written in step S220 to acquire a fourth hash value, and forms the reading information consisting of the read data, the fourth hash value and a header. The memory sends the reading information through the physical bus to the non-secure operating system, and the reading information is sent by the non-secure operating system to the secure operating system.

In step S730, the RPMB section data in the reading information is encrypted or decrypted by using the root key stored in the secure operating system of the processor to acquire a third hash value.

As described above, the root key of the RPMB section is written to the memory and also store in the secure memory. Thus, when reading data of the RPMB section needs to be received, the secure operating system run by the processor reads the root key from the secure memory, and adopts an operation method such as that in step S720 to perform an operation by using the read root key and the read data to acquire the third hash value.

In step S740, when it is compared and determined that the fourth hash value in the reading information is consistent with the third hash value, the data of the RPMB section is correspondingly processed.

The secure operating system run by the processor parses and acquires the fourth hash value from the reading information, and compares the fourth hash value with the third hash value calculated in step S730. If the two hash values are consistent, the read data is correspondingly processed; if not, the read data is discarded.

In this embodiment, verification of a reading operation of the RPMB section between the processor and the memory is achieved, preventing illegal modification on the data to the written during a transmission process.

A processing circuit is further provided according to an embodiment of the present invention. The processing circuit may be the processor 120 shown in FIG. 1 and is for performing the method of the foregoing embodiments. Specifically, the processing circuit may be a security chip.

Figure 8:
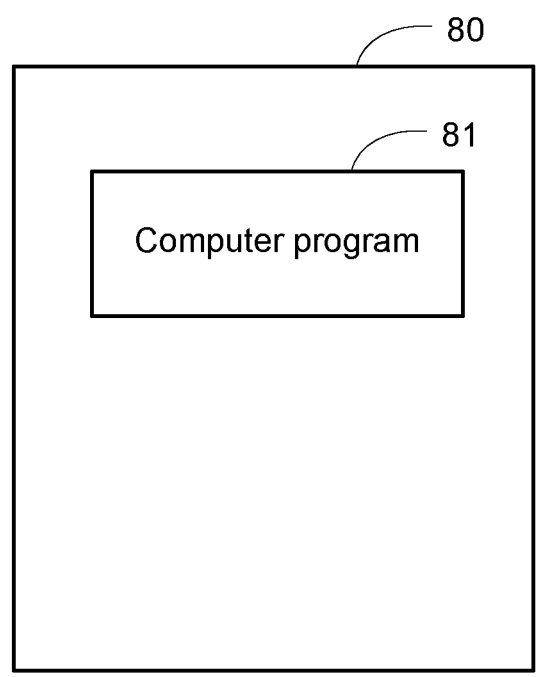
FIG. 8 is a structural schematic diagram of a non-volatile storage medium according to an embodiment of the present invention.

FIG. 8 shows a structural schematic diagram of a non-volatile storage medium according to an embodiment of the present invention. The storage medium 80 stores a computer program 81, which is executed by, for example, the above processor, and is for performing the methods of the foregoing embodiments. In one embodiment, the non-volatile storage medium may be the above memory, e.g., an EMMC, and the computer program 81 is stored in a storage region other than the RPMB section of the memory.

In the above solution, the processor writes a root key of the RPMB section to a memory during a secure activation process. Because the processor has not yet activated any non-secure operating system during the secure activation process, the root key of the RPMB section does not go through the non-secure operating system during the process of writing the root key of the RPMB section, hence preventing leakage of the root key of the RPMB section in the memory when in the non-secure operating system, further ensuring RPMB section replay prevention protection.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A root key processing method, performed by a processor connected to a memory configured with a replay protected memory block (RPMB) section, the root key processing method comprising:
    after the processor is powered on, detecting that a root key of the RPMB section is not stored in the memory, wherein the root key is for verifying whether data written to or data read from the RPMB section has been illegally modified;
    in response to the root key of the RPMB section being detected as not stored in the memory, performing a secure activation process of the processor, comprising:
        generating the root key of the RPMB section according to a memory identifier of the memory and a processor identifier of the processor; and
        storing the root key of the RPMB section in the memory;
    activating a secure operating system by the processor after the root key of the RPMB section is stored to the memory; and
    activating a non-secure operating system by the processor after the secure operating system is activated,
    wherein the secure operating system performs reading and writing operations on the memory through the non-secure operating system.

2. The root key processing method according to claim 1, wherein
    the root key of the RPMB section is stored in a predetermined region of the memory, and
    the predetermined region is configured to be written only once.

3. The root key processing method according to claim 1, wherein the processor identifier of the processor is a private key written to an internal storage region of the processor, the internal storage region is configured not to be modified after factory ship-out of the processor and inaccessible by the non-secure operating system.

4. The root key processing method according to claim 1, wherein the generating the root key of the RPMB section comprises:
    reading the memory identifier from the memory, filling the memory identifier of the memory to a predetermined length to obtained a filled memory identifier, and reading the processor identifier of the processor from the processor; and
    encrypting or decrypting the processor identifier of the processor and the filled memory identifier to acquire the root key of the RPMB section.

5. The root key processing method according to claim 1, wherein the storing the root key of the RPMB section comprises:
 after initialization performed by the processor in the secure activation process on a dynamic random access memory (DRAM) and before the non-secure operating system is activated, storing the root key of the RPMB section in the memory.

6. The root key processing method according to claim 1, wherein the secure activation process further comprises:
 initializing the processor;
 loading a predetermined secure key to a static random access memory (SRAM);
 loading a first boot loader to the SRAM, and executing the first boot loader in the SRAM after successfully verifying the first boot loader by using the predetermined secure key;
 initializing a dynamic random access memory (DRAM);
 loading a second boot loader to the DRAM, and executing the second boot loader in the SRAM after successfully verifying the second boot loader by using the predetermined secure key;
 loading codes of the secure operating system to activate the secure operating system.

7. The root key processing method according to claim 1, wherein the processor is a security chip, and the memory is an embedded multi-media card (EMMC).

8. The root key processing method according to claim 1, further comprising:
 storing the root key of the RPMB section in a secure memory of the processor;
 when it is determined that the secure operating system is to perform the writing operation,
  reading a write counter of the RPMB section, and encrypting data to be written and the write counter according to the root key stored in the secure memory to acquire a first hash value, and
  sending a writing instruction comprising the data to be written, the write counter, and the first hash value to the memory through the non-secure operating system, such that the memory encrypts the data to be written and the write counter in the writing instruction according to the root key stored in the RPMB section to acquire a second hash value, and writes the data to be written to the RPMB section when it is compared and determined that the write counter in the writing instruction is consistent with a current write counter of the RPMB section and the first hash value in the writing instruction is consistent with the second hash value;
 when it is determined that the secure operating system is to perform the reading operation,
  sending a reading instruction to the memory through the non-secure operating system,
  receiving through the non-secure operating system reading information sent by the processor in response to the reading instruction,
  encrypting or decrypting RPMB section data in the reading information according to the root key stored in the secure memory to acquire a third hash value, and
  performing corresponding processing on the RPMB section data when it is compared and determined that a fourth hash value in the reading information is consistent with the third hash value, wherein the fourth hash value is acquired by performing an operation on the RPMB section data according to the root key by the memory.

9. A processing device, comprising
 a memory configured with a replay protected memory block (RPMB) section; and
 a processor coupled with the memory, the processor being configured to:
 after the processor is powered on, detect whether a root key of the RPMB section is stored in the memory, wherein the root key is for verifying whether data written to or data read from the RPMB section has been illegally modified;
 in response to the root key of the RPMB section being detected as not stored in the memory, perform a secure activation process of the processor, comprising:
  generating the root key of the RPMB section according to a memory identifier of the memory and a processor identifier of the processor; and
  storing the root key of the RPMB section in the memory;
 activate a secure operating system after the root key of the RPMB section is stored to the memory; and
 activate a non-secure operating system after the secure operating system is activated,
 wherein the secure operating system performs reading and writing operations on the memory through the non-secure operating system.

10. The processing device according to claim 9, wherein the root key of the RPMB section is stored in a predetermined region of the memory, and
 the predetermined region is configured to be written only once.

11. A non-transitory computer-readable storage medium storing a computer program, which when executed by a processor of the computer, cause the computer to perform a method comprising:
 after the processor is powered on, detecting whether a root key of a replay protected memory block (RPMB) section of a memory is stored in the memory, wherein the root key is for verifying whether data written to or data read from the RPMB section has been illegally modified;
 in response to the root key of the RPMB section being detected as not stored in the memory, performing a secure activation process of the processor, comprising:
  generating the root key of the RPMB section according to a memory identifier of the memory and a processor identifier of the processor; and
  storing the root key of the RPMB section in the memory;
 activating a secure operating system after the root key of the RPMB section is stored to the memory; and
 activating a non-secure operating system after the secure operating system is activated,
 wherein the secure operating system performs reading and writing operations on the memory through the non-secure operating system.

12. The non-transitory computer-readable storage medium according to claim 11, wherein
 the root key of the RPMB section is stored in a predetermined region of the memory, and
 the predetermined region is configured to be written only once.

* * * * *